United States Patent
Wu et al.

(10) Patent No.: US 10,259,954 B2
(45) Date of Patent: Apr. 16, 2019

(54) ADHESION PROMOTER AND INK COMPOSITION

(71) Applicant: BORICA CO., LTD., Taipei (TW)

(72) Inventors: Cheng-En Wu, Taipei (TW); Yu-Yung Lin, Taipei (TW); Chun-Han Shih, Taipei (TW); Shu-Han Lee, Taipei (TW); Fu-Ming Tsuo, Taipei (TW)

(73) Assignee: BORICA CO., LTD., Taipei (TW)

( * ) Notice: Subject to any disclaimer, the term of this patent is extended or adjusted under 35 U.S.C. 154(b) by 0 days.

(21) Appl. No.: 15/712,164

(22) Filed: Sep. 22, 2017

(65) Prior Publication Data

US 2018/0094148 A1    Apr. 5, 2018

Related U.S. Application Data

(60) Provisional application No. 62/401,905, filed on Sep. 30, 2016.

(51) Int. Cl.
| | | |
|---|---|---|
| *C09D 11/03* | (2014.01) | |
| *C08K 5/00* | (2006.01) | |
| *C09D 11/033* | (2014.01) | |
| *C09D 11/037* | (2014.01) | |
| *C09D 11/08* | (2006.01) | |
| *C09D 11/102* | (2014.01) | |
| *C08G 85/00* | (2006.01) | |
| *C09D 11/10* | (2014.01) | |
| *C09D 11/14* | (2006.01) | |
| *C09D 11/104* | (2014.01) | |
| *C08K 5/11* | (2006.01) | |
| *C08K 5/101* | (2006.01) | |

(52) U.S. Cl.
CPC ............ *C09D 11/03* (2013.01); *C08G 85/004* (2013.01); *C09D 11/033* (2013.01); *C09D 11/037* (2013.01); *C09D 11/08* (2013.01); *C09D 11/10* (2013.01); *C09D 11/102* (2013.01); *C09D 11/104* (2013.01); *C09D 11/14* (2013.01); *C08K 5/0091* (2013.01); *C08K 5/101* (2013.01); *C08K 5/11* (2013.01)

(58) Field of Classification Search
None
See application file for complete search history.

(56) References Cited

U.S. PATENT DOCUMENTS

| | | | |
|---|---|---|---|
| 4,931,094 A | 6/1990 | Barfurth et al. | |
| 5,021,596 A * | 6/1991 | Barfurth | C07F 7/003 106/31.69 |
| 5,897,694 A * | 4/1999 | Woolf | C09D 11/36 106/31.27 |
| 7,619,021 B2 | 11/2009 | Duncan | |
| 8,722,811 B2 | 5/2014 | Duncan et al. | |
| 9,034,958 B2 * | 5/2015 | Mielke | C08F 8/40 524/123 |
| 9,139,716 B2 | 9/2015 | Crandon et al. | |
| 9,279,034 B2 | 3/2016 | Mielke et al. | |

* cited by examiner

*Primary Examiner* — Vu A Nguyen
(74) *Attorney, Agent, or Firm* — CKC & Partners Co., LLC

(57) ABSTRACT

An ink composition and an adhesion promoter are provided. The adhesion promoter is suitable for production while remaining the stronger adhesion. The adhesion promoter is formed by the reaction of at least one alpha hydroxy acid, at least one alpha hydroxy acid ester, and a polymer having hydroxyl group, amino group, carboxyl group, or a combination thereof with a metal alkoxide. By combining the renewable and green alpha hydroxy acid and safer plasticizing alpha hydroxy acid ester, and the polymer as reagents to react with the metal alkoxide, the eco-friendly and non-toxic adhesion promoter with superior adhesion for use in ink composition can be obtained. The ink composition includes the adhesion promoter, a pigment, a polymeric binder, and a solvent for the polymeric binder. The ink composition is odorless and colorless, and shows good wet crinkle resistance. Especially, the ink composition is suitable for printing on the food package.

17 Claims, No Drawings

ADHESION PROMOTER AND INK COMPOSITION

CROSS-REFERENCE TO RELATED APPLICATION

This application claims priority to U.S. Provisional Application Ser. No. 62/401,905, filed Sep. 30, 2016, which is herein incorporated by reference.

BACKGROUND

Field of Invention

The present invention relates to an ink composition and an adhesion promoter. More particularly, the present invention relates to an ink composition and an adhesion promoter for use in ink composition, wherein the adhesion promoter includes a reaction product of a metal alkoxide, a mixture of at least one alpha hydroxy acid and at least one alpha hydroxy acid ester, and at least one polymer having hydroxyl group, amino group, carboxyl group, or a combination thereof.

Description of Related Art

Adhesion promoters have long been used in inks to promote adhesion properties to enable the inks to adhere to a variety of substrates and thus meet requirements of customers and end-users.

However, in some printing ink formulation processes, adhesion promoters such as titanium acetylacetonates tend to impart undesirable by-products to the ink. These by-products may have undesired yellow color and odor and thus adversely influence the resulting inks. Moreover, the toxic acetylacetone derivative ingredient is not suitable for being printed on food package due to potential migration problem. Based on above, it is required adhesion promoters with superior adhesion and safety to satisfy the current industrial needs.

SUMMARY

The present disclosure provides an adhesion promoter. The adhesion promoter includes a reaction product of a metal alkoxide, a mixture of at least one alpha hydroxy acid and at least one alpha hydroxy acid ester, and at least one polymer having hydroxyl group (—OH), amino group (—NH$_2$), carboxyl group (—COOH), or a combination thereof. More specifically, by combining the renewable and green alpha hydroxy acid and safer plasticizing alpha hydroxy acid ester, and the polymer as reagents to react with the metal alkoxide, the eco-friendly and non-toxic adhesion promoter with superior adhesion for use in ink composition can be obtained. The metal alkoxide has a formula of M(OR$_1$)(OR$_2$)(OR$_3$)(OR$_4$), wherein M is titanium, zirconium, or aluminum, and R$_1$, R$_2$, R$_3$, and R$_4$ are independently C$_1$ to C$_8$ alkyl group. The alpha hydroxy acid is selected from the group consisting of glycolic acid, lactic acid, malic acid, tartaric acid, and citric acid. The alpha hydroxy acid ester is selected from the group consisting of glycolic acid ester, lactic acid ester, malic acid ester, tartaric acid ester, and citric acid ester.

In some embodiments, the glycolic acid ester has a formula of CH$_2$OH(COOR$_5$), and R$_5$ is C$_2$ to C$_6$ alkyl group.

In some embodiments, the lactic acid ester has a formula of C$_2$H$_4$OH(COOR$_6$), and R$_6$ is C$_2$ to C$_6$ alkyl group.

In some embodiments, the malic acid ester has a formula of C$_2$H$_3$OH(COOR$_7$)(COOR$_8$), R$_7$ and R$_8$ are independently H atom or C$_2$ to C$_6$ alkyl group, and one of R$_7$ and R$_8$ is an alkyl group.

In some embodiments, the tartaric acid ester has a formula of C$_2$H$_2$(OH)$_2$(COOR$_9$)(COOR$_{10}$), R$_9$ and R$_{10}$ are independently H atom or C$_2$ to C$_6$ alkyl group, and one of R$_9$ and R$_{10}$ is an alkyl group.

In some embodiments, the citric acid ester has a formula of C$_3$H$_4$OH(COOR$_{11}$)(COOR$_{12}$)(COOR$_{13}$), R$_{11}$, R$_{12}$ and R$_{13}$ are independently H atom or C$_2$ to C$_6$ alkyl group, and one of R$_{11}$, R$_{12}$ and R$_{13}$ is an alkyl group.

In some embodiments, the mixture further comprises water.

In some embodiments, the polymer is selected from the group consisting of polyol, polyurethane, polyurethane-urea, polyamide, polyacrylate, ketone-formaldehyde copolymer, nitrocellulose, polyvinyl alcohol, ketonic resin, alkyd, and polysaccharide.

In some embodiments, the at least one polymer having the hydroxyl group has a hydroxyl number of from about 30 mg KOH/g to about 500 mg KOH/g.

In some embodiments, a ratio of a number of the hydroxyl group of the at least one polymer having the hydroxyl group to a number of M of the metal alkoxide is 0.25-4:1.

In some embodiments, the at least one polymer having the amino group has an amine value of from about 3.5 mg KOH/g to about 15 mg KOH/g.

In some embodiments, a ratio of a number of the amino group of the at least one polymer having the amino group to a number of M of the metal alkoxide is 0.25-4:1.

In some embodiments, the mixture has a carboxylic acid number of from about 50 mg KOH/g to about 400 mg KOH/g.

In some embodiments, a ratio of a total mole of the at least one alpha hydroxy acid and the at least one alpha hydroxy acid ester to a mole of the metal alkoxide is 0.2 to 4:1.

The present disclosure provides an ink composition. The ink composition includes a pigment, a polymeric binder, a solvent for the polymeric binder, and an adhesion promoter including a reaction product of a metal alkoxide, a mixture of at least one alpha hydroxy acid and at least one alpha hydroxy acid ester, and at least one polymer having hydroxyl group (—OH), amino group (—NH$_2$), carboxyl group (—COOH), or a combination thereof. The metal alkoxide has a formula of M(OR$_1$)(OR$_2$)(OR$_3$)(OR$_4$), wherein M is titanium, zirconium, or aluminum, and R$_1$, R$_2$, R$_3$, and R$_4$ are independently C$_1$ to C$_8$ alkyl group. The alpha hydroxy acid is selected from the group consisting of glycolic acid, lactic acid, malic acid, tartaric acid, and citric acid. The alpha hydroxy acid ester is selected from the group consisting of glycolic acid ester, lactic acid ester, malic acid ester, tartaric acid ester, and citric acid ester.

In some embodiments, the adhesion promoter is present at a concentration of from 1% to 20% by weight, based on the total weight of the ink composition.

In some embodiments, the polymeric binder has at least one functional group selected from the group consisting of hydroxyl group (—OH), amino group (—NH$_2$), carboxyl group (—COOH), cyanate group (—NCO), and ester group.

These and other features, aspects, and advantages of the present invention will become better understood with reference to the following description and appended claims.

It is to be understood that both the foregoing general description and the following detailed description are by examples, and are intended to provide further explanation of the invention as claimed.

DETAILED DESCRIPTION

The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, integers, steps, operations, elements, and/or components, but do not preclude the presence or addition of one or more other features, integers, steps, operations, elements, components, and/or groups thereof.

The present disclosure provides an ink composition and an adhesion promoter for use in ink composition. More specifically, the adhesion promoter is for formulating ink composition. In some embodiments, the adhesion promoter is used in printing ink composition. The printing ink composition may be used for printing paper, foil, and plastic substrates, especially the plastic films for food packaging or flexible substrates. The material of plastic substrate includes but not limited to polyester, polyethylene, polypropylene, and co-extruded polyolefin.

Compared to paper or foil, the adhesion between printing ink composition and plastic films is weaker due to their extreme low surface energy characteristics. Therefore, the printing ink composition must need an adhesion promoter which can improve the adhesion on plastic films for industrial production.

Both physical and chemical interaction induced by adhesion promoters can enhance the adhesion between printing ink and plastic films. The adhesion promoter improves the adhesion by providing the chemical bond formation between the plastics films and printing ink. This chemical reaction is also called crosslinking reaction. A metal alkoxide can be chosen as adhesion promoter because of the chemical bond formation ability with oxygen-rich species (e.g. the binder in printing ink). However, the metal alkoxide is too reactive with the oxygen-rich species; therefore, the oxygen-rich species added with the metal alkoxide is too stable and has poor fluidity. Accordingly, the metal alkoxide cannot be used as adhesion promoter alone. In order to solve the above issues, the metal alkoxide can be chelated by at least one ligand formed from a mixture of at least one alpha hydroxy acid and at least one alpha hydroxy acid ester and reacted with at least one polymer having hydroxyl group (—OH), amino group (—NH$_2$), carboxyl group (—COOH), or a combination thereof to strike a balance between reactivity and stability after mixing with the printing ink. The alpha hydroxy acid and alpha hydroxy acid ester are lower toxicity substance. It states different combinations of the alpha hydroxy acid, the alpha hydroxy acid ester, and the polymer can be chosen according to the need of formulator. The reaction product of the metal alkoxide, the at least one alpha hydroxy acid, the at least one alpha hydroxy acid ester, and the polymer, can retain the adhesion-improving ability and lower toxicity by controlling the residual alkoxy group on metal and the carboxylic acid groups in the mixture. Also, controlling of the alkyl group on the alpha hydroxy acid ester can increase the compatibility to the plastic films and polymer binders in printing ink.

The adhesion promoter of the present disclosure includes a reaction product of a metal alkoxide, an acid ester mixture including at least one alpha hydroxy acid and at least one alpha hydroxy acid ester, and at least one polymer having hydroxyl group (—OH), amino group (—NH$_2$), carboxyl group (—COOH), or a combination thereof. The at least one alpha hydroxy acid includes one or more alpha hydroxy acids. The at least one alpha hydroxy acid ester includes one or more alpha hydroxy acid esters. The at least one polymer includes one or more polymers.

In other words, the adhesion promoter is formed by reacting the metal alkoxide, the at least one alpha hydroxy acid, the at least one alpha hydroxy acid ester, and the polymer having hydroxyl group, amino group, carboxyl group, or a combination thereof. In some embodiments, the step of reacting the metal alkoxide, the at least one alpha hydroxy acid, the at least one alpha hydroxy acid ester, and the polymer is performed at a temperature from about 20° C. to about 200° C. In some other embodiments, the temperature is from about 20° C. to about 100° C. In some embodiments, the polymer is a solvent-based polymer. In some embodiments, before reacting the metal alkoxide, the at least one alpha hydroxy acid, the at least one alpha hydroxy acid ester, and the polymer, the polymer is dissolved in a solvent such as an alcohol, an ester, a ketone, or a hydrocarbon. For example, the solvent includes ethanol, propan-1-ol, isopropanol, n-butanol, ethyl acetate, propyl acetate, n-butyl acetate, acetone, butanone, cyclohexanone, n-hexane or n-heptaneor a combination thereof. In some embodiments, the polymer is present at a concentration of from 20% to 70% by weight, based on the total weight of the solvent and the polymer.

The metal alkoxide has a formula of $M(OR_1)(OR_2)(OR_3)(OR_4)$, wherein M is titanium, zirconium, or aluminum, and $R_1$, $R_2$, $R_3$, and $R_4$ are independently $C_1$ to $C_8$ alkyl group. More specifically, $R_1$, $R_2$, $R_3$, and $R_4$ are independently linear or branched alkyl group. In some embodiments, $R_1$, $R_2$, $R_3$, and $R_4$ are independently methyl, ethyl, n-propyl, isopropyl, n-butyl, sec-butyl, isobutyl, tert-butyl, n-pentyl, tert-pentyl, neopentyl, isopentyl, sec-pentyl, 3-pentyl, hexyl, heptyl, or octyl. In some embodiments, $R_1$, $R_2$, $R_3$, and $R_4$ are independently propyl or butyl, and $R_1$, $R_2$, $R_3$, and $R_4$ include at least one propyl and at least one butyl; therefore, the metal alkoxide is propyl butyl metal alkoxide. In some other embodiments, $R_1$, $R_2$, $R_3$, and $R_4$ are n-propyl, and thus the metal alkoxide is tetra n-propyl metal alkoxide. In still some other embodiments, $R_1$, $R_2$, $R_3$, and $R_4$ are isopropyl, and thus the metal alkoxide is tetra isopropyl metal alkoxide.

The alpha hydroxy acid is selected from the group consisting of glycolic acid, lactic acid, malic acid, tartaric acid, and citric acid. The alpha hydroxy acid ester is selected from the group consisting of glycolic acid ester, lactic acid ester, malic acid ester, tartaric acid ester, and citric acid ester.

In some embodiments, the glycolic acid ester has a formula of $CH_2OH(COOR_5)$, and $R_5$ is $C_2$ to $C_6$ alkyl group.

In some embodiments, the lactic acid ester has a formula of $C_2H_4OH(COOR_6)$, and $R_6$ is $C_2$ to $C_6$ alkyl group. In some embodiments, the malic acid ester has a formula of $C_2H_3OH(COOR_7)(COOR_8)$. $R_7$ and $R_8$ are independently H atom or $C_2$ to $C_6$ alkyl group, and one of $R_7$ and $R_8$ is an alkyl group. In some embodiments, the tartaric acid ester has a formula of $C_2H_2(OH)_2(COOR_9)(COOR_9)$. $R_9$ and $R_{10}$ are independently H atom or $C_2$ to $C_6$ alkyl group, and one of $R_9$ and $R_{10}$ is an alkyl group. In some embodiments, the citric acid ester has a formula of $C_3H_4OH(COOR_{11})(COOR_{12})(COOR_{13})$. $R_{11}$, $R_{12}$ and $R_{13}$ are independently H atom or $C_2$ to $C_6$ alkyl group, and one of $R_{11}$, $R_{12}$ and $R_{13}$ is an alkyl group. In some embodiments, $R_5$ to $R_{13}$ are independently linear or branched alkyl group. In some embodiments, $R_5$ to $R_{13}$ are independently ethyl, n-propyl, isopropyl, n-butyl, sec-butyl, isobutyl, tert-butyl, n-pentyl, tert-pentyl, neopentyl, isopentyl, sec-pentyl, 3-pentyl, or hexyl.

In some embodiments, the carboxylic acid number of the acid ester mixture is in the range of from about 50 mg KOH/g to about 400 mg KOH/g. In some embodiments, a mole ratio of the acid ester mixture to the metal alkoxide is 0.2 to 4:1.

In some embodiments, the polymer having hydroxyl group (—OH), amino group (—NH$_2$), carboxyl group (—COOH), or a combination thereof is selected from the group consisting of polyol, polyurethane, polyurethane-urea, polyamide, polyacrylate, ketone-formaldehyde copolymer, nitrocellulose, polyvinyl alcohol, ketonic resin, alkyd, and polysaccharide. For example, the polyol is polyester polyol or polyether polyol. In some embodiments, the at least one polymer has the hydroxyl group and has a hydroxyl number of from about 30 mg KOH/g to about 500 mg KOH/g. In some embodiments, the at least one polymer has the hydroxyl group, and a ratio of a number of the hydroxyl group of the at least one polymer to a number of M of the metal alkoxide is 0.25-4:1. In some embodiments, the at least one polymer has the amino group and has an amine value of from about 3.5 mg KOH/g to about 15 mg KOH/g. In some embodiments, the at least one polymer has the amino group, and a ratio of a number of the amino group of the at least one polymer to a number of M of the metal alkoxide is 0.25-4:1.

It is noted that the adhesion promoter of the present disclosure includes the reaction product of the metal alkoxide, the acid ester mixture, and the polymer. More specifically, after the reaction of the metal alkoxide, the acid ester mixture, and the polymer, the ingredient in the acid ester mixture would bind to the metal atom and the polymer would also bind to the metal atom.

For example, when one carboxylic acid group on the citric acid is reacted with the metal alkoxide, the metal alkoxide loses one alkoxy group (for example, OR$_1$, OR$_2$, OR$_3$, or OR$_4$), and the citric acid loses one hydrogen atom of the carboxylic group and then bonds with the metal atom of the metal alkoxide. Further, for example, when the tri-alkyl citrate is reacted with the metal alkoxide, the tri-alkyl citrate may bond with the metal atom of the metal alkoxide with its hydroxyl groups by transesterification. More specifically, the alkoxy group of the metal alkoxide may be replaced with the hydroxyl group of the tri-alkyl citrate. The way of the mono-alkyl citrate and the di-alkyl citrate binding with the metal alkoxide can be inferred from the descriptions above, and therefore is not repeated herein. It is noted that one metal alkoxide can react with one reactant or at least two reactants simultaneously. If the metal alkoxide react with at least two reactants, the at least two reactants can be different. For example, the alpha hydroxy acid is citric acid, and the at least one alpha hydroxy acid ester includes mono-alkyl citrate, di-alkyl citrate, tri-alkyl citrate, or a combination thereof. In some embodiments, the metal alkoxide reacts with the citric acid and the mono-alkyl citrate simultaneously. In some other embodiments, the metal alkoxide reacts with the mono-alkyl citrate and the di-alkyl citrate simultaneously. In still some other embodiments, the metal alkoxide reacts with the citric acid, the mono-alkyl citrate, and the di-alkyl citrate simultaneously.

Moreover, when the polymer having hydroxyl group (—OH), amino group (—NH$_2$), carboxyl group (—COOH), or a combination thereof is reacted with the metal alkoxide, the alkoxy group of the metal alkoxide may be replaced with the hydroxyl group, the amino group, the carboxyl group of the polymer. The metal alkoxide may react with at least two polymers. In some embodiments, the at least two polymers can be different.

In some embodiments, the acid ester mixture further includes water. More specifically, the adhesion promoter includes a reaction product of a metal alkoxide and an acid ester mixture including at least one alpha hydroxy acid, at least one alpha hydroxy acid ester, the polymer, and water. It is noted that the compounds having alkoxy group which are reaction products of the metal alkoxides, the acid ester mixture, and the polymer, or the metal alkoxides, may react with water, and thus the alkoxy groups of the compounds or the metal alkoxides may be replaced with hydroxyl groups (—OH). Specifically, the water may promote the hydrolysis and polymerization of the metal alkoxides, and the alpha hydroxy acid ester is not hydrolyzed by the water due to the reaction rate difference. After that, the hydrolyzed product can further react with another metal alkoxides or hydrolyzed metal alkoxides to form a larger molecule, together with the loss of water or alcohols. This reaction is a condensation reaction. Accordingly, the reaction product of the metal alkoxide and the acid ester mixture including water may include many kinds of condensation compounds. The above condensation reaction can be further illustrated by the following example. For example, after two compounds having a formula of $M(L_1)(L_2)(L_3)(OR)$ react with water, two compounds having a formula of $M(L_1)(L_2)(L_3)(OH)$ are formed, wherein $L_1$, and $L_2$, and $L_3$ are independently a ligand formed from a citric acid, a mono-alkyl citrate, a di-alkyl citrate, a tri-alkyl citrate, or a polymer having hydroxyl group, amino group, carboxyl group, or a combination thereof, and OR is an alkoxy group. After that, the two compounds having a formula of $M(L_1)(L_2)(L_3)(OH)$ may combine to form $M(L_1)(L_2)(L_3)$-O-$M(L_1)(L_2)(L_3)$ and water.

The ink composition of the present disclosure includes a pigment, a polymeric binder, a solvent for the polymeric binder, and an adhesion promoter. In some embodiments, the adhesion promoter is present at a concentration of from 1% to 20% by weight, based on the total weight of the ink composition.

In the present disclosure, the ink composition includes one or more pigments. The pigments may be inorganic pigment or organic pigment. In some embodiments, the pigment is TiO$_2$. In some embodiments, the polymeric binder has at least one functional group selected from the group consisting of hydroxyl group (—OH), amino group (—NH$_2$), carboxyl group (—COOH), cyanate group (—NCO), and ester group. For example, the polymeric binder includes polyester resin, polyamide resin, polyurethane resin, polyurethane-urea resin, nitrocellulose, polyacrylate resin, polyol resin, polyester polyol resin, polyether polyol resin, ketonic resin, ketone-formaldehyde copolymer, polyvinyl alcohol, or a combination thereof. In some embodiments, the polyacrylate resin is polymethylmethacrylate (PMMA). In some embodiments, the solvent for the polymeric binder includes alcohol, ester, ketone, hydrocarbon solvent, or a combination thereof. For example, the alcohol is ethanol, propan-1-ol, isopropanol, or n-butanol. For example, the ester is ethyl acetate, propyl acetate, or n-butyl acetate. For example, the ketone is acetone, butanone, or cyclohexanone. For example, the hydrocarbon solvent is n-hexane or n-heptane.

The disclosure is further illustrated by the following examples, which are not to be construed as limiting this disclosure in scope or spirit to the specific procedures herein described. It is to be understood that the examples are provided to illustrate certain embodiments and that no limitation to the scope of the disclosure is intended. It is to be further understood that resort may be had to various other embodiments, modifications, and equivalents thereof which may suggest themselves to those skilled in the art without departing from the spirit of the present disclosure and/or scope of the appended claims.

Example 1: Preparation of Adhesion Promoter (Product 1) Including a Reaction Product of Tetra n-Propyl Zirconate, Citric Acid Ester Mixture, and Resin VariPlus SK In a clean and dry reactor under nitrogen, n-propyl acetate (1.69 grams) was charged along with resin VariPlus SK (1.69 grams) obtained from Degussa. The resulting slurry was stirred and heated to 50-60° C. until all of the resin dissolved. The reaction temperature was then cooled to 25-35° C. Tetra n-propyl zirconate (4.64 grams) was added over 15 minutes, and the mixture was stirred for 15 minutes. Subsequently, a mixture of citric acid, mono-ethyl citrate, di-ethyl citrate and tri-ethyl citrate (hereafter referred to as "Mixture 1") (5.23 grams) was then added over 20 minutes while the reaction temperature was maintained below 60° C. The total mole of Mixture 1 is around 21.00 mmol, and the carboxylic acid number of Mixture 1 is around 200 mg KOH/g. When the addition was completed, the temperature was held at 60° C. for 1 hour. Thereafter, the resulting product was discharged at 25-35° C. through a filter bag to obtain Product 1, a clear and light-yellow liquid. Product 1 has a Gardner color scale of 3-5 and a Brookfield viscosity (No. 3 spindle at 60 rpm) of 30-200 mPa·s at 25° C.

Example 2: Preparation of Adhesion Promoter (Product 2) Including a Reaction Product of Tetra i-Propyl Titanate, Citric Acid Ester Mixture, and Polyester Polyol In a clean and dry reactor under nitrogen, polyester polyol (10.13 grams, ca. MW 3000, the polyester polyol was BA-3000 from Shung-Bang IND. CORP. which synthesized by adipic acid/butane glycol) was preheated to 60° C. and charged. Tetra i-propyl titanate (3.00 grams) was added over 15 minutes, and the mixture was stirred for 15 minutes. Mixture 1 (5.23 grams) was then added over 20 minutes while the reaction temperature was maintained below 60° C. When the addition was completed, the temperature was held at 60° C. for 1 hour. Thereafter, the resulting product was discharged at 25-35° C. through a filter bag to obtain Product 2.

Example 3: Preparation of Adhesion Promoter (Product 3) Including a Reaction Product of Tetra i-Propyl Titanate, Tartric Acid Ester Mixture, and Polyamide Resin Uni-Rez 138

In a clean and dry reactor under nitrogen, ethanol (7.40 grams) was charged along with a polyamide resin Uni-Rez 138 (7.40 grams). The resulting solution was stirred until all of the resin dissolved. Tetra i-propyl titanate (3.00 grams) was added over 15 minutes, and the mixture was stirred for 15 minutes. Subsequently, a mixture of tartaric acid, mono-ethyl tartrate, di-ethyl tartrate and (hereafter referred to as "Mixture 2") (3.96 grams) was then added over 20 minutes while the reaction temperature was maintained below 60° C. When the addition was completed, the temperature was held at 60° C. for 1 hour. Thereafter, the resulting product was discharged at 25-35° C. through a filter bag to obtain Product 3. The total mole of Mixture 2 is around 20.70 mmol, and the carboxylic acid number of Mixture 2 is around 198 mg KOH/g.

Example 4: Preparation of Adhesion Promoter (Product 4) Including a Reaction Product of Tetra n-Propyl Zirconate, Malic Acid Ester Mixture, and Polyether Polyol In a clean and dry reactor under nitrogen, polyether polyol (10.13 grams, ca. MW 3000, the polyol was polypropylene glycol PT3000 from Dow Chemical Company) was charged. Tetra n-propyl zirconate (4.64 grams) was added over 15 minutes, and the mixture was stirred for 15 minutes. Subsequently, a mixture of malic acid, mono-ethyl malate, di-ethyl malate and (hereafter referred to as "Mixture 3") (3.56 grams) was then added over 20 minutes while the reaction temperature was maintained below 60° C. When the addition was completed, the temperature was held at 60° C. for 1 hour. Thereafter, the resulting product was discharged at 25-35° C. through a filter bag to obtain Product 4. The total mole of Mixture 3 is around 20.3 mmol, and the carboxylic acid number of Mixture 3 is around 175 mg KOH/g.

Example 5: Preparation of Adhesion Promoter (Product 5) Including a Reaction Product of Tetra i-Propyl Titanate, Malic Acid Ester Mixture, and Hydroxyl Functional Polyurethane Resin NeoRez U-471

In a clean and dry reactor under nitrogen, ethanol (7.40 grams) was charged along with a hydroxyl functional polyurethane resin NeoRez U-471 (7.40 grams). The resulting solution was stirred until all of the resin dissolved. Tetra i-propyl titanate (3.00 grams) was added over 15 minutes, and the mixture was stirred for 15 minutes. Mixture 3 (3.56 grams) was then added over 20 minutes while the reaction temperature was maintained below 60° C. When the addition was completed, the temperature was held at 60° C. for 1 hour. Thereafter, the resulting product was discharged at 25-35° C. through a filter bag to obtain Product 5.

Example 6: Preparation of Ink Composition

The compositions used for forming Inks 1-9 are listed in the following Table 1, in which Inks 1, 2, and 8 are comparative examples, and Ink 9 is control example. Ink 3 was prepared by the following steps. A dispersion including denatured ethanol (18.5 g), ethyl acetate (27.5 g), nitrocellulose (9.5 g), resin VariPlus SK (2.0 g), and polyurethane resin (15.0 g) was stirred and heat to 50-60° C., and then $TiO_2$ (27.5 g) was added to the dispersion. Subsequently, an adhesion promoter, Product 1 (2.5 g), was added to form Ink 3. Other ink compositions (Inks 2, 4, 5, 6, 7, and 8) were also formed by the processes described above; however, the adhesion promoters used for forming Inks 2, 4, 5, 6, 7, and 8 were different from that for Ink 3, and Inks 1 and 9 do not include any adhesion promoter. In Table 1, the nitrocellulose was obtained from T. N. C. Industrial Co., Ltd., and its trade name is SS 1/8. The polyurethane resin was obtained from Morchem, and its trade name is TP629. VERTEC™ RJCE and VERTEC™ PI2 are commercial adhesion promoters.

TABLE 1

|  |  | Ink 1 | Ink 2 | Ink 3 | Ink 4 | Ink 5 | Ink 6 | Ink 7 | Ink 8 | Ink 9 |
|---|---|---|---|---|---|---|---|---|---|---|
| Solvent | Denatured ethanol (g) | 18.5 | 18.5 | 18.5 | 18.5 | 18.5 | 18.5 | 18.5 | 18.5 | 18.5 |
|  | Ethyl acetate (g) | 27.5 | 27.5 | 27.5 | 27.5 | 27.5 | 27.5 | 27.5 | 27.5 | 27.5 |
| Polymeric binder | Nitrocellulose(g) | 9.5 | 9.5 | 9.5 | 9.5 | 9.5 | 9.5 | 9.5 | 9.5 | 9.5 |
|  | Resin VariPlus SK (g) | 4.5 | 2.0 | 2.0 | 2.0 | 2.0 | 2.0 | 2.0 | 2.0 | 2.0 |
|  | Polyurethane resin (g) | 15.0 | 15.0 | 15.0 | 15.0 | 15.0 | 15.0 | 15.0 | 15.0 | 15.0 |
| Pigment | $TiO_2$ (g) | 27.5 | 27.5 | 27.5 | 27.5 | 27.5 | 27.5 | 27.5 | 27.5 | 27.5 |
| Adhesion promoter | VERTEC ™ RJCE (g) | NA | 2.5 | NA | NA | NA | NA | NA | NA | NA |
|  | Product 1 | NA | NA | 2.5 | NA | NA | NA | NA | NA | NA |
|  | Product 2 | NA | NA | NA | 2.5 | NA | NA | NA | NA | NA |
|  | Product 3 | NA | NA | NA | NA | 2.5 | NA | NA | NA | NA |
|  | Product 4 | NA | NA | NA | NA | NA | 2.5 | NA | NA | NA |
|  | Product 5 | NA | NA | NA | NA | NA | NA | 2.5 | NA | NA |
|  | VERTEC ™ PI2 (g) | NA | NA | NA | NA | NA | NA | NA | 2.5 | NA |
|  | Total weight (g) | 102.5 | 102.5 | 102.5 | 102.5 | 102.5 | 102.5 | 102.5 | 102.5 | 100 |

Example 7: Adhesion Test of Ink Composition

Inks 1-9 were printed on an oriented polypropylene film treated by corona-discharge. The printed film was dried. The adhesion of each of Inks 1-9 was tested after different storage time. The adhesion test includes the following steps. An adhesive tape (18 mm wide) is applied to cover the surfaces of Inks 1-9 to ensure the test conditions are identical. After a period of storage time, the adhesive tape is removed from the surfaces of Inks 1-9 simultaneously, and results are determined by the percentage ink remaining in the total test area after removal of the adhesive tape. The adhesion test results are shown in the following Table 2.

TABLE 2

|  | Storage time | | | | |
|---|---|---|---|---|---|
|  | 1 min | 5 min | 15 min | 30 min | 60 min |
| Ink 1 | 10% | 16% | 18% | 22% | 28% |
| Ink 2 | 7% | 8% | 15% | 26% | 30% |
| Ink 3 | 50% | 60% | 70% | 85% | 95% |
| Ink 4 | 25% | 31% | 42% | 57% | 75% |
| Ink 5 | 13% | 25% | 31% | 32% | 41% |
| Ink 6 | 24% | 35% | 48% | 62% | 78% |
| Ink 7 | 33% | 48% | 67% | 72% | 79% |
| Ink 8 | 40% | 60% | 75% | 90% | 95% |
| Ink 9 | 5% | 8% | 10% | 12% | 15% |

Example 8: Odor Test, Color Test, and Wet Crinkle Test of Ink Composition

In the odor test, Inks 1-9 were printed on different oriented polypropylene films treated by corona-discharge respectively. The printed films were dried and then respectively stored in sealed glass jars for 24 hours at 40° C. The odor of each of Inks 1-9 was assessed by a panel of 5 people on a scale from 1 (no perceptible odor) to 5 (very strong odor). The data are averaged and then rounded to the nearest whole number, and the results are listed in the following Table 3.

In the color test, Inks 1-9 were printed on different oriented polypropylene films treated by corona-discharge respectively. The printed films were dried and then respectively stored in sealed glass jars for 24 hours at 40° C. The color of each of Inks 1-9 was assessed by a panel of 5 people on a scale from 1 (no perceptible color) to 5 (severe yellow color). The data are averaged and then rounded to the nearest whole number, and the results are listed in the following Table 3.

Further, the wet crinkle test is used to assess adhesion when a printed film is wet. In the wet crinkle test, Inks 1-9 were printed on different oriented polypropylene films treated by corona-discharge respectively. The printed films were dried, and then were rubbed between the knuckles several times under cold running water. The wet crinkle resistance of each of Inks 1-9 was assessed visually by observing the undamaged remaining ink in the test area by a panel of 5 people on a scale from 1 (no ink removal) to 5 (severe removal). The data are averaged and then rounded to the nearest whole number, and the results are listed in the following Table 3.

TABLE 3

|  | Odor test | Color test | Wet crinkle test |
|---|---|---|---|
| Ink 1 | 1 | 1 | 3 |
| Ink 2 | 1 | 1 | 2 |
| Ink 3 | 1 | 1 | 1 |
| Ink 4 | 1 | 1 | 1 |
| Ink 5 | 1 | 1 | 2 |
| Ink 6 | 1 | 1 | 1 |
| Ink 7 | 1 | 1 | 1 |
| Ink 8 | 4 | 5 | 1 |
| Ink 9 | 1 | 1 | 4 |

From Table 3, it can be seen that Inks 3, 4, 5, 6 and 7, which include the adhesion promoters prepared by metal alkoxide, acid ester mixture, and polymer, are odorless and colorless, and show good wet crinkle resistance.

In view of the foregoing, the present disclosure provides ink compositions and adhesion promoters for use in ink composition. The adhesion promoters include a reaction product of a metal alkoxide, an acid ester mixture, and a polymer. The acid ester mixture may further include water. The manufacturing process of the adhesion promoters do not need any purification step and are simple. Moreover, the ink compositions including the adhesion promoter of the present disclosure are odorless and colorless and show good wet crinkle resistance. It is noted that the adhesion promoters include a mixture of many kinds of compounds, and therefore the properties of the adhesion promoters can be easily adjusted to meet various requirements.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An adhesion promoter comprising a reaction product of:
    (A) a metal alkoxide having a formula of $M(OR_1)(OR_2)(OR_3)(OR_4)$, wherein M is titanium, zirconium, or aluminum, and $R_1$, $R_2$, $R_3$, and $R_4$ are independently $C_1$ to $C_8$ alkyl group;
    (B) a mixture of at least one alpha hydroxy acid and at least one alpha hydroxy acid ester, wherein the alpha hydroxy acid is selected from the group consisting of glycolic acid, lactic acid, malic acid, tartaric acid, and citric acid, and the alpha hydroxy acid ester is selected from the group consisting of glycolic acid ester, lactic acid ester, malic acid ester, tartaric acid ester, and citric acid ester; and
    (C) at least one polymer having hydroxyl group (—OH), amino group (—$NH_2$), carboxyl group (—COOH), or a combination thereof.

2. The adhesion promoter of claim 1, wherein the glycolic acid ester has a formula of $CH_2OH(COOR_5)$, and $R_5$ is $C_2$ to $C_6$ alkyl group.

3. The adhesion promoter of claim 1, wherein the lactic acid ester has a formula of $C_2H_4OH(COOR_6)$, and $R_6$ is $C_2$ to $C_6$ alkyl group.

4. The adhesion promoter of claim 1, wherein the malic acid ester has a formula of $C_2H_3OH(COOR_7)(COOR_8)$, $R_7$ and $R_8$ are independently H atom or $C_2$ to $C_6$ alkyl group, and one of $R_7$ and $R_8$ is an alkyl group.

5. The adhesion promoter of claim 1, wherein the tartaric acid ester has a formula of $C_2H_2(OH)_2(COOR_9)(COOR_{10})$, $R_9$ and $R_{10}$ are independently H atom or $C_2$ to $C_6$ alkyl group, and one of $R_9$ and $R_{10}$ is an alkyl group.

6. The adhesion promoter of claim 1, wherein the citric acid ester has a formula of $C_3H_4OH(COOR_{11})(COOR_{12})(COOR_{13})$, $R_{11}$, $R_{12}$ and $R_{13}$ are independently H atom or $C_2$ to $C_6$ alkyl group, and one of $R_{11}$, $R_{12}$ and $R_{13}$ is an alkyl group.

7. The adhesion promoter of claim 1, wherein the mixture further comprises water.

8. The adhesion promoter of claim 1, wherein the polymer is selected from the group consisting of polyol, polyurethane, polyurethane-urea, polyamide, polyacrylate, ketone-formaldehyde copolymer, nitrocellulose, polyvinyl alcohol, ketonic resin, alkyd, and polysaccharide.

9. The adhesion promoter of claim 1, wherein the at least one polymer having the hydroxyl group has a hydroxyl number of from about 30 mg KOH/g to about 500 mg KOH/g.

10. The adhesion promoter of claim 1, wherein the at least one polymer having the amino group has an amine value of from about 3.5 mg KOH/g to about 15 mg KOH/g.

11. The adhesion promoter of claim 1, wherein a ratio of a number of the hydroxyl group of the at least one polymer having the hydroxyl group to a number of M of the metal alkoxide is 0.25-4:1.

12. The adhesion promoter of claim 1, wherein a ratio of a number of the amino group of the at least one polymer having the amino group to a number of M of the metal alkoxide is 0.25-4:1.

13. The adhesion promoter of claim 1, wherein the mixture has a carboxylic acid number of from about 50 mg KOH/g to about 400 mg KOH/g.

14. The adhesion promoter of claim 1, wherein a ratio of a total mole of the at least one alpha hydroxy acid and the at least one alpha hydroxy acid ester to a mole of the metal alkoxide is 0.2 to 4:1.

15. An ink composition comprising:
    a pigment;
    a polymeric binder;
    a solvent for the polymeric binder; and
    the adhesion promoter of claim 1.

16. The ink composition of claim 15, wherein the adhesion promoter is present at a concentration of from 1% to 20% by weight, based on the total weight of the ink composition.

17. The ink composition of claim 15, wherein the polymeric binder has at least one functional group selected from the group consisting of hydroxyl group (—OH), amino group (—$NH_2$), carboxyl group (—COOH), cyanate group (—NCO), and ester group.

* * * * *